United States Patent [19]

Barfield

[11] Patent Number: 4,893,430
[45] Date of Patent: Jan. 16, 1990

[54] MULTI-JOINTED BEADED FISHING WORM LURE

[76] Inventor: Timmy R. Barfield, 1304 Collins Park St., Conway, S.C. 29526

[21] Appl. No.: 279,874

[22] Filed: Dec. 5, 1988

[51] Int. Cl.⁴ ............................................. A01K 85/00
[52] U.S. Cl. ................................................... 43/42.24
[58] Field of Search .................. 43/42.1, 42.11, 42.15, 43/42.22, 42.24, 42.28, 42.31, 42.37, 42.39, 42.43, 43.14, 43.6

[56] References Cited

U.S. PATENT DOCUMENTS

| | | | |
|---|---|---|---|
| 2,481,789 | 9/1949 | Smith | 43/42.15 |
| 2,636,304 | 4/1953 | Swenson | 43/42.24 |
| 3,017,716 | 1/1962 | Hawks | 43/42.24 |
| 3,349,513 | 10/1967 | Jeff | 43/42.24 |
| 3,983,656 | 10/1976 | Bain | 43/42.31 |
| 4,312,148 | 1/1982 | Hardwicke | 43/42.1 |
| 4,744,168 | 5/1988 | McClellan | 43/42.24 |
| 4,750,290 | 6/1988 | Renaud | 43/42.24 |

Primary Examiner—Nicholas P. Godici
Assistant Examiner—Michael William Starkweather
Attorney, Agent, or Firm—Cort Flint

[57] ABSTRACT

A multi-jointed, artificial fishing worm (A) is disclosed which includes a buoyant head (B) and a beaded worm body (C) having a major length and consisting of a series of spherical beads (18) threaded upon a flexible fishing line (16). The beads are threaded loosely on the fishing line to provide a prescribed spacing (30) and a flexible joint (26) about which worm body (C) flexes in all directions to simulate the natural motion of a worm upon retrieval of the artificial lure. A weight (D) threaded onto the fishing line and about the middle of worm body (C) provides an unusual undulating motion to worm body sections (22 and 24) defined on either side of weight (D). The amount of weight (D) may be prescribed in order to change artificial fishing worm (A) from a top water lure to a lure which may be fished at desired depths below the surface of the water.

20 Claims, 3 Drawing Sheets

MULTI-JOINTED BEADED FISHING WORM LURE

BACKGROUND OF THE INVENTION

The invention relates to artificial fishing lures, and more particularly to artificial fishing lures of the artificial worm type.

With the advent of more leisure and recreational time, fishing has become an increasingly popular sport. With the increasing popularity of fishing has come the development of various and sundry types of artificial fishing lures. The artificial fishing worm lure constructed from various types of rubber and plastic materials has become increasingly popular. This lure typically consists of an elongated pliable worm body which looks and feels attractive to the mouth of a fish. The worm body normally is formed as a unitary length of resilient material which is threaded upon a fish hook at a head of the lure. Other fishing hooks may also be embedded in the fishing worm along its length. The pliable, flexible nature of the rubber or plastic material allows the worm to flex and simulate a worm naturally present in the water. While this type of artificial fishing worm is very effective and popular for fishing, it is normally fished on the bottom rather than being suited for top water fishing, and is relatively limited in its flexibility.

Spherical beads have been commonly used in artificial fishing lures such as shown in U.S. Pat. Nos. 2,603,025; 2,708,805; 3,079,723; and 4,142,319. The spherical beads have been used to attract fish rather than to simulate the body portion of a natural bait such as a worm. The use of spherical beads has been mainly for glitter and attraction. The previous usages of spherical beads in artificial fishing baits have not provided a multi-jointed flexing action for a body of a natural fishing bait.

U.S. Pat. No. 2,481,789 discloses an artificial fishing lure in the form of a wiggling worm designed to provide a steady wiggling action in the water. The lure consists of body sections independently linked together with chain links so that flexibility is not continuous but rather disjointed over the entire body length. U.S. Pat. No. 4,312,148 discloses a resilient plastic fishing worm with an appendage that renders the lure weedless, yet allows hook penetration.

Accordingly, an important object of the present invention is to provide an artificial fishing worm lure which is buoyant and may be fished on the top of the water.

Another object of the invention is to provide an artificial fishing worm lure in which the joint-ability and flexibility of a body portion of the worm is increased to attract fish to provide a more enhanced simulation of a motion of a natural worm.

Another object of the invention is to provide an artificial fishing worm lure having increased buoyancy for top water fishing which may be weighted to provide for bottom fishing as well as fishing at desired depths between the surface and bottom of the water.

Another object of the invention is to provide an artificial fishing worm lure having a buoyant head and elongated worm body portion wherein the worm body portion is constructed form a series of spherical beads which provide a multi-jointed body having increased flexibility and also produces an audible noise that attracts fish.

Another object of the invention is to provide an artificial fishing worm lure having a multi-jointed fishing worm body provided by a series of rounded bead-like members and wherein weights may be included in various portions of the worm body to provide individual flexing segments as well as fishing at depths below the surface of the water.

SUMMARY OF THE INVENTION

The above objectives are accomplished according to the present invention by providing an artificial fishing worm which includes a worm head and an elongated major worm body. The worm body is constructed of a series of spherical beads threaded onto a single flexible strand of monofilament fishing line. The elongated fishing worm body had a length ratio of about four to one with the worm head. The beads are carried on the flexible strand loosely with a spacing between the beads allowing the beads to shift and the fishing line flex in a highly effective manner to simulate an attractive natural worm motion during retrieval. Preferably, the head and the spherical beads of the worm body are buoyant so the artificial worm lure may be fished on the top of the water. By adding a weight to a medial portion of the beaded worm body, the worm lure may be fished below the surface of the water and on the bottom as well, depending on the amount of weight. By locating the weight in about the medial portion of the beaded worm body, plural worm body sections are caused to flex on the sides of the weight to provide a natural worm motion in the water as the lure rises and falls during retrieval.

DESCRIPTION OF THE DRAWINGS

FIG. 3 is an elevation of a prior art artificial fishing worm constructed from rubber and the like;

The construction designed to carry out the invention will hereinafter be described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Referring now in more detail to the drawings, there is illustrated an artificial multi-jointed fishing worm designated generally as A, artificial fishing worm A includes a buoyant head B and a multi-jointed elongated worm body C carried by and trailing head B. A fish hook 10 is carried with head B in any suitable manner. Preferably, head B is constructed from a buoyant material such as wood, cork, or a suitable plastic material which is buoyant. Preferably, the head of the artificial fishing worm lure is tapered or rounded having a body which tapers at 12a from a head end 12 of worm A toward a tail end 14 of the worm.

Figure 6:
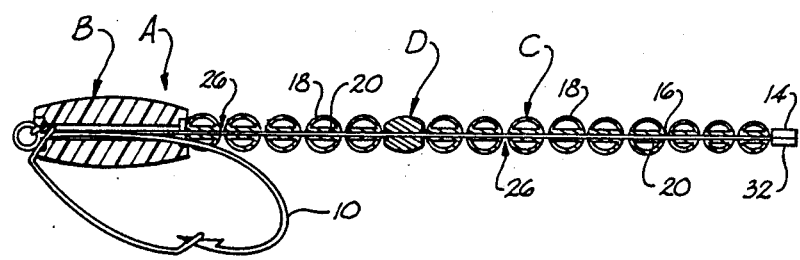
FIG. 6 is a sectional view taken along the middle of the artificial fishing worm from FIG. 2.

A flexible strand 16 is attached to buoyant worm A by any suitable means such as attachment to an eye 11 of fish hook 10. Preferably, flexible strand 16 is a strand of plastic monofilament fishing line. It is to be understood, of course, that flexible strand 16 may be made from many different materials as long as they provide sufficient flexibility to worm body B. Worm body C further comprises a plurality and series of spherical or rounded beads 18 which are threaded onto the flexible strand. Most preferably, spherical beads 14 are individually buoyant and include a hollow bore 20 diametrically extending through the spherical bead, as can best be seen in FIG. 6. In this manner, flexible fishing line may be threaded through the individual beads which cannot fill with water so as to reduce their buoyancy. Buoyant head B and the buoyancy of spherical beads 14 of worm body C provide an artificial fishing worm lure which may be fished on the top surface, as can best be seen in FIG. 8.

Figure 1:
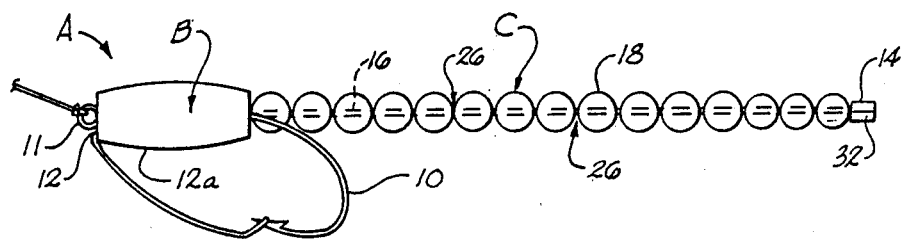
FIG. 1 is an elevation illustrating an artificial fishing worm constructed according to the present invention for top water fishing.
Figure 2:
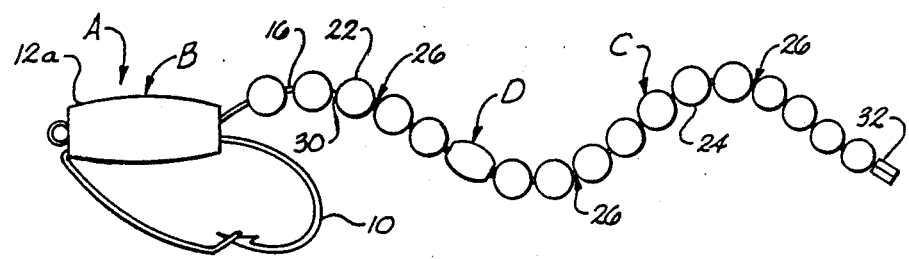
FIG. 2 is an elevation of an artificial fishing worm constructed according to the present invention for fishing at depths below the surface of the water.
Figure 3:
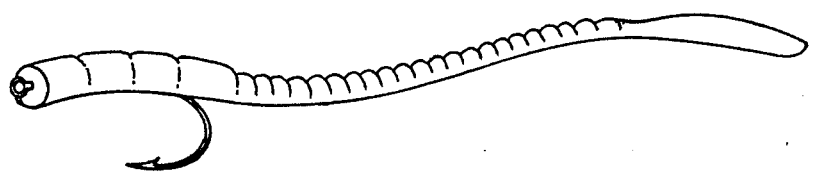
Figure 8:
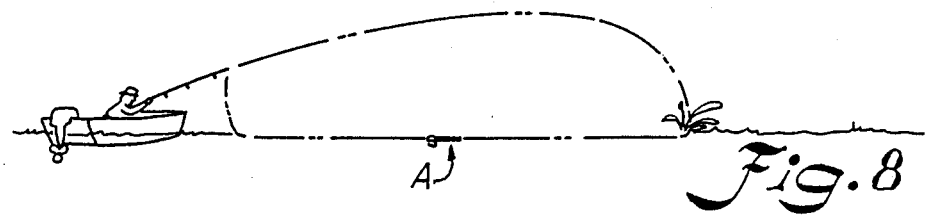
FIG. 8 is a perspective view illustrating fishing the artificial fishing worm of the present invention on the top surface of the water.
Figure 9:
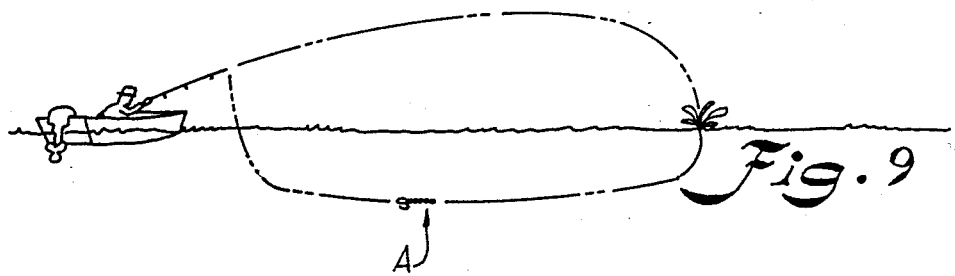
FIG. 9 is a perspective view illustrating fishing the fishing worm constructed according to the present invention at an intermediate depth below the surface of the water.
Figure 10:
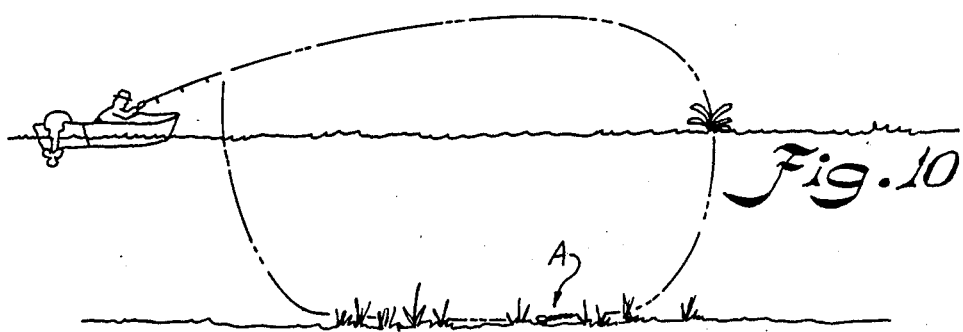
FIG. 10 is a perspective view illustrating retrieving an artificial worm constructed according to the present invention on the bottom surface of the water.

As can best be seen in FIG. 2, weight means D may be added to at least one portion of worm body C so that the artificial fishing lure may be submerged and fished below the surface of the water (FIGS. 8, 9). Preferably, weight means is provided by a weight having a generally "egg" shaped tapered body that tapers from the head end 12 toward tail end 14 of fishing worm A in a manner that it blends visually and fluid dynamically with beads 18. The amount of weight used and the spacing of the weight may be varied for several desired effects. First, the amount of weight may be varied to provide bottom fishing (FIG. 10) or at intermediate depths between the water surface and the bottom. Secondly, as can be seen in FIG. 2, the weight divides worm body C into two independently flexible worm sections 22, 24. By spacing the weights as desired, the worm body may be changed into as many individual sections as desired.

Figure 4:
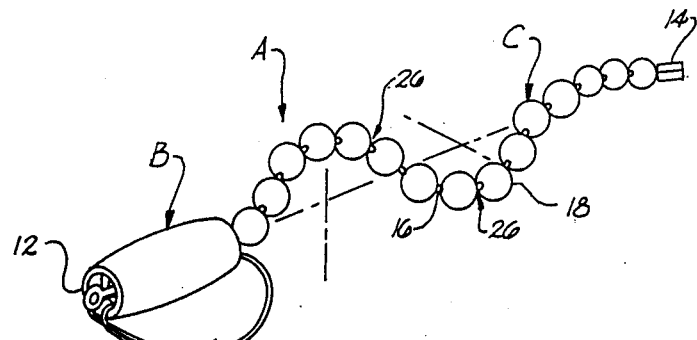
FIG. 4 is a perspective view of an artificial fishing lure constructed according to the present invention illustrating the omnidirectional flexibility of the fishing worm body.

A joint, designated generally as 26 is defined between each adjacent bead 18 so that worm body C may flex omnidirectionally along the length of flexible strand 16. The construction allows the worm body to flex in all directions in vertical and horizontal plane (FIG. 4). As can best be seen in FIG. 6, it will be noted that the beads are not compacted tightly on the flexible strand but rather includes a prescribed spacing 30 between adjacent spherical beads. The individual joints provided between adjacent beads may thus shift longitudinally along continuous flexible strand 16 as the worm body undulates which provides for a high degree of flexibility and multi-jointed action of the worm body which produces a highly effective simulation of live worm movement. Means for retaining the spherical beads on flexible strands are provided by a clip 32 at the tail end of the worm body which may be crimped onto strand 16.

Figure 5:
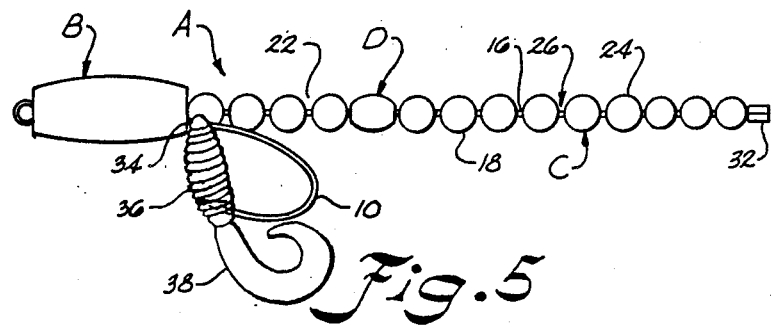
FIG. 5 is an elevation of an artificial fishing worm constructed according to the present invention having a weedless fish hook according to the invention.

As can best be seen in FIG. 5, a weedless hook is provided by a smaller artificial worm 34 having a head 36 carried by worm head B in any suitable manner. Preferably, the end of worm head 36 includes an opening (not shown), like a split fork, through which fish hook 10 is threaded until the head is fitted against worm head B as shown. A medial portion 36 is penetrated by the point of hook 10, leaving a free tail portion 38 depending from the hook. The body of weedless worm 34 is soft and resilient to allow hook penetration into a fish mouth.

It will thus be seen that a highly advantageous construction can be had for an artificial worm fishing lure according to the invention wherein the major worm body of the worm is made from a series of beads shiftable on a continuous strand providing a highly attractive flexing action in all directions. For this purpose major body C is preferably about four times the length of head B. For example, head B may be about one inch and worm body C about four inches in length. A ratio, of about 4:1 provides a good natural worm flexing action, although this may vary some without departing from the desired action and losing the advantages of the invention.

The shape, spacing, and shifting of the beads also produces a gnarling type water noise as the worm is retrieved through the water which provides an additional attraction to the fish.

Figure 7:
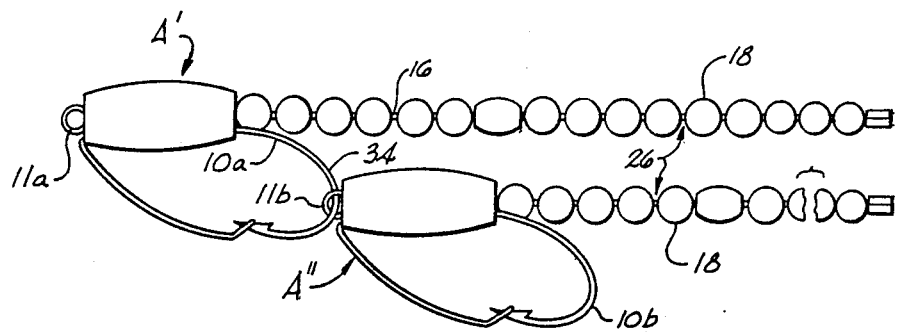
FIG. 7 is an elevation illustrating an alternate embodiment of an artificial fishing worm lure constructed according to the present invention.

As can best be seen in FIG. 7, an alternate embodiment of the invention is illustrated wherein a first artificial fishing worm A' is illustrated constructed similarly to an artificial fishing worm described in the preceding figures. In addition, a second artificial fishing worm, A" includes an eyelet 11b received over the bite 40 of fish hook 10a of worm A'. In this manner, a double fishing worm lure is provided in a manner that plural hooks may be arranged and provided on a beaded worm fishing lure constructed according to the present invention. It is also contemplated that plural hooks may also be used depending from certain portions of beaded worm body C while not affecting the flexibility sufficiently to depart from all of the advantages.

While a preferred embodiment of the invention has been described using specific terms, such description is for illustrative purposes only, and it is to be understood that changes and variations may be made without departing from the spirit or scope of the following claims.

What is claimed is:

1. A multi-joined fishing lure comprising:
    an artificial worm having a head end and a tail end;
    a worm head carried at said head end;
    a multi-jointed worm body substantially elongated relative to said worm head carried by said worm head; said elongated worm body including a continuous flexible strand, a plurality of generally spherical beads carried individually by said strand in series trailing said worm head, and said spherical beads being generally longitudinally shiftable along said strand facilitating undulating of said worm body during retrieval through the water;

a joint formed between each spherical bead so that said worm body may flex continuously along its length in all directions to simulate the natural motion of a live worm; and at least one fish hook carried by said worm.

2. The lure of claim 1 including a hollow cylindrical bore formed through each spherical bead through which said flexible strand is threaded, said spherical beads with said hollow cylindrical bore being individually buoyant so that said multi-jointed worm body is generally buoyant for top water fishing.

3. The lure of claim 1 including weight means carried intermediate opposing ends of said multi-jointed worm body creating a plurality of multi-jointed worm body sections which flex about said weight means independently of each other to undulate and simulate said natural motion.

4. The lure of claim 1 wherein said fish hook is a weedless fish hook which includes an elongated resilient member constructed from a soft pliable material having an end carried near said buoyant head and a medial portion engagable by a sharpened fish hook end, said fish hook end and elongated resilient member being constructed and arranged such that said fish hook end penetrates said elongated resilient member under the force of the bite of a fish to hook said fish.

5. The lure of claim 4 wherein said elongated resilient member is constructed in the form of a relatively smaller worm having a free tail depending from said medial portion.

6. A multi-jointed fishing worm lure comprising:
a buoyant worm head;
a fishing hook carried by said buoyant worm head;
a multi-jointed elongated worm body carried by said buoyant worm head, said worm body having a length ratio to said buoyant worm head of at least about 4:1;
said elongated worm body composed of a flexible strand carried by said buoyant worm head, a series of rounded beads carried on said flexible strand, said rounded beads having a hollow bore extending diametrically across said rounded beads through which said flexible strand is threaded;
said rounded beads trailing said buoyant worm head and being slidably carried on said flexible strand with spacing between adjacent beads so that said worm body pivots about said buoyant worm head and flexes between adjacent rounded beads individually in an undulating manner to simulated a natural motion of a live worm; and
means for limiting movement of a last of said rounded beads on said flexible strand away from said buoyant worm head to retain said series of rounded beads on said flexible strand.

7. The lure of claim 6 including weight means carried intermediate opposing ends of said multi-jointed worm body creating a plurality of multi-jointed worm body sections which flex about said weight means independently of each other to undulate and simulate said natural worm motion.

8. The lure of claim 7 wherein said weight means includes a weight through which said flexible strand is threaded that is arranged between a pair of adjacent rounded beads.

9. The lure of claim 8 wherein said weight includes a tapered weight having a body which tapers toward said buoyant head.

10. The lure of claim 6 wherein said buoyant head includes a tapered body which tapers toward a head end of said buoyant head and toward a tail end of said worm body.

11. The lure of claim 6 wherein said fish hook is a weedless fish hook which includes an elongated resilient member constructed from a soft pliable material having an end carried by said buoyant head, a medial portion engagable by a sharpened fish hook end, and a free tail depending from said medial portion; and said fish hook end and elongated resilient member being constructed and arranged such that said fish hook end penetrates said elongated resilient member under the force of the bite of a fish to hook said fish.

12. A multi-jointed fishing worm lure which may be floated near the surface of water or may be submerged for fishing under the surface of the water comprising:
a buoyant worm head;
a multi-jointed worm body pivotally carried by said buoyant worm head substantially elongated relative to said buoyant worm head, said worm body including a flexible strand, a plurality of generally spherical beads carried individually by said strand defining a joint between each bead so that said worm body may flex in all directions to simulate the natural motion of a live worm, and said spherical beads being generally longitudinally shiftable along said strand facilitating undulating of said worm body during retrieval through the water;
each said spherical bead being buoyant so that said worm body is generally buoyant independent of said buoyant worm head; and
at least one fish hook carried by said buoyant worm head.

13. The lure of claim 12 including a hollow cylindrical bore formed through each spherical bead through which said flexible strand is threaded, said spherical beads with said hollow cylindrical bore being individually buoyant so that said multi-jointed worm body is generally buoyant independent of said buoyant head for top water fishing.

14. The lure of claim 12 including weight means carried intermediate opposing ends of said multi-jointed worm body creating a plurality of multi-jointed worm body sections which flex about said weight means independently of each other to undulate and simulate said natural motion, said weight means submerging said buoyant head and worm body so that said lure may be retrieved at a desired depth under the surface of said water.

15. The lure of claim 12 wherein said spherical beads are slidably carried on said flexible strand and a prescribed spacing is included between each said spherical bead wherein said joints between adjacent beads may shift longitudinally along said flexible strand enhancing the flexibility of said worm body.

16. The lure of claim 12 wherein said flexible strand has a length which extends from said buoyant head to a free end of said worm body which free end defines a tail end of said lure, and said spherical beads are carried on said flexible strand over generally the entire length of said flexible strand.

17. The lure of claim 16 wherein said flexible strand consists of a monofilament of polymeric material.

18. The lure of claim 12 wherein said fish hook is a weedless fish hook which includes an elongated resilient member constructed from a soft pliable material having an end carried near said buoyant head, a medial portion engagable by a sharpened fish hook end, and a free tail depending from said medial portion; and said fish hook end and elongated resilient member being constructed and arranged such that said fish hook end penetrates said elongated resilient member under the force of the bite of a fish to hook said fish.

19. The lure of claim 12 wherein said spherical beads generally have a diameter relative to said buoyant head and are constructed and arranged in series with said buoyant head so as to produce an audible generally gnarling type noise when retrieved through said water which attracts fish.

20. The lure of claim 12 including a second buoyant head; a second beaded worm body carried by said second worm head; a second fishing hook carried by said second buoyant head; said second fishing hook having an eyelet through which is received a shank portion of said first mentioned fishing hook to provide a double worm multi-jointed fishing worm lure.

* * * * *